Jan. 7, 1964

W. H. BIXBY 3,117,292

SMOOTHING FILTER HAVING BALANCING MEANS FOR
COMPENSATING INTERNAL RESISTANCE
OF ELECTROLYTIC CAPACITOR

Filed Aug. 23, 1960

INVENTOR
W. H. BIXBY

BY

*G. F. Heuerman*

ATTORNEY

Jan. 7, 1964   W. H. BIXBY   3,117,292
SMOOTHING FILTER HAVING BALANCING MEANS FOR
COMPENSATING INTERNAL RESISTANCE
OF ELECTROLYTIC CAPACITOR
Filed Aug. 23, 1960   2 Sheets-Sheet 2

INVENTOR
W. H. BIXBY
BY
*G. F. Heuerman*
ATTORNEY 3,117,292
SMOOTHING FILTER HAVING BALANCING MEANS FOR COMPENSATING INTERNAL RESISTANCE OF ELECTROLYTIC CAPACITOR
William H. Bixby, Columbus, Ohio, assignor to International Business Machines Corporation, New York, N.Y., a corporation of New York
Filed Aug. 23, 1960, Ser. No. 51,424
14 Claims. (Cl. 333—79)

This invention relates to rectifying apparatus and more particularly to rectifying apparatus having improved ripple suppressing filtering means.

An object of the invention is to provide an improved rectifier-filter.

If a perfect condenser or capacitor were connected across the output of a rectifier and its load, the ripple voltage appearing at the capacitor and load terminals would vary inversely with the frequency of the ripple component of the rectified current, assuming that the average voltage across the capacitor and the average load current are maintained constant. It would therefore be desirable to supply alternating current of relatively high frequency to the rectifier input in order to gain economy of apparatus in the filter circuit while meeting the requirement for a specified low value of ripple voltage at the load terminals.

It is desirable to employ a condenser of the electrolytic type in the ripple filter because of its relatively low cost and small size for a capacitor having a suitably large capacitance. It has been found, however, that available electrolytic capacitors have an impedance characterized by effective resistance, inductance and capacitance all in series. When such an electrolytic condenser is employed alone as a shunt capacitor filter, it has been found that for a given applied voltage and load current on the filter the ripple voltage will fall to a minimum value and then rise as the frequency of the source voltage is increased. This minimum ripple voltage is considerably larger than the ripple voltage would be if the condenser had only capacitance. Moreover, additional ripple voltage reduction could be realized by further increasing the frequency of the source if the condenser had only capacitance and no resistance or inductance component in its impedance characteristic.

In accordance with the present invention there are provided means for compensating for the equivalent series resistance and for compensating in part at least for the equivalent series inductance of an electrolytic condenser to improve the ripple reduction of an electrolytic condenser ripple filter.

In a specific embodiment of the invention, herein shown and described for the purpose of illustration, there is provided a rectifier across the output terminals of which are connected an electrolytic condenser and a resistor in series. The primary of a transformer is connected across the resistor and the transformer secondary is connected in series with the electrolytic condenser and a load. The ratio of the secondary turns to the primary turns of the transformer is made substantially equal to the ratio of the equivalent series resistance of the electrolytic capacitor to the resistance of the external resistor. The core of the transformer is provided with a suitable gap devoid of magnetic material to prevent saturation of the core due to direct current flowing through the transformer windings.

Due to the relatively high frequencies associated with the ripple voltages, very few turns are required on the transformer core and consequently a very small gap in the magnetic circuit is required. Because of the relatively high ripple frequencies, no difficulty is experienced in proportioning the transformer so as to maintain the primary input impedance large compared to the resistance of the external resistor. Any ripple voltage due to ripple current flowing through the resistor and the electrolytic capacitor in series appears across the transformer primary and by transformation there appears across the transformer secondary a voltage substantially equal to the voltage across the internal resistance of the electrolytic capacitor due to the same ripple current. The voltage across the transformer secondary is impressed upon the load circuit in series opposition to the ripple voltage across the internal resistance of the electrolytic capacitor, thus greatly reducing or substantially eliminating the ripple component.

The electrolytic capacitor will have some equivalent series inductance in addition to its series resistance and this can have a pronounced effect on the ripple voltage at relatively high ripple frequencies, for example, ripple frequencies of the order of 10,000 cycles per second. The external resistor will also have some inductance associated with its own configuration and the wiring which connects the resistor into the circuit. With proper care in selecting the resistor and the wiring in the circuit, it is possible also to make the ratio of the secondary transformer turns to the primary turns substantially equal to the ratio of the internal equivalent series inductance of the electrolytic capacitor to the inductance of the external resistor together with its connecting leads. The principal consideration is to make the inductance of the external resistor and the connecting leads sufficiently small since the equivalent series inductance of a 13,500-microfarad, 15-volt D.C. capacitor, for example, is only of the order of 0.07 microhenry.

It is desired that the transformer should have as low a leakage reactance as possible and the external resistor should have the correct resistance value to compensate for the effect of the internal resistance of the electrolytic condenser. At ripple frequencies greater than the frequency at which the equivalent series capacitance and the equivalent series inductance of the electrolytic capacitor would be in series resonance, it is especially desirable that the external resistor together with its connecting leads should also have the correct inductance to effect compensation, as described above.

In a modified embodiment of the invention herein shown and described for further illustrating the invention, there is provided a bridge circuit having one pair of opposite vertices connected to the rectifier output and the other pair of opposite vertices connected to the load. Substantially identical electrolytic capacitors are connected in one pair of opposite arms of the bridge respectively and substantially identical resistors are connected in the remaining opposite arms, respectively. The resistance of each of the external resistors is made substantially equal to the internal equivalent series resistance of each of the electrolytic condensers. Preferably also the inductance associated with each of the resistors and its connecting leads is made substantially equal to the equivalent series inductance of each of the electrolytic condensers.

The invention will now be described in greater detail with reference to the accompanying drawing in which.

Figure 1:
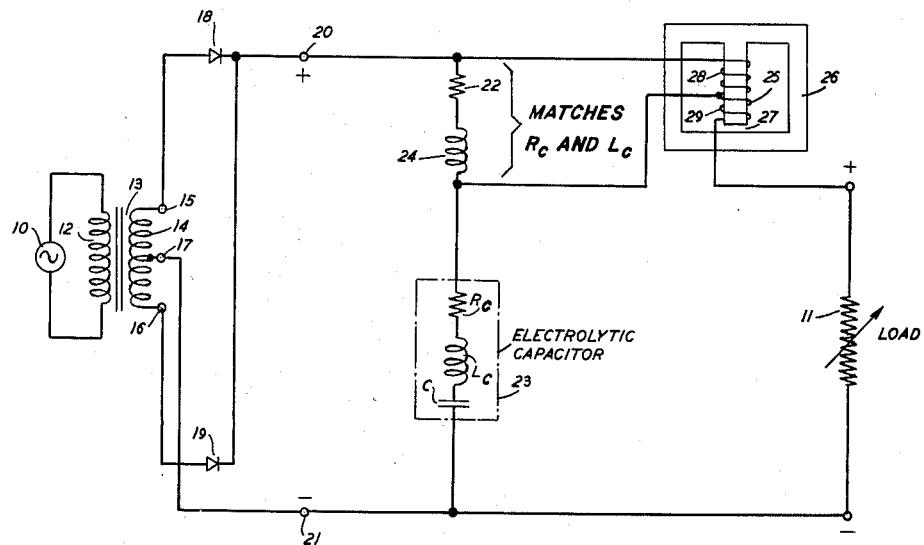
FIG. 1 is a schematic view of rectifying apparatus embodying the invention.

Referring now to FIG. 1 of the drawing, there are provided a biphase rectifier and a capacitor filter for rectifying and filtering current from an alternating-current supply source 10 and for supplying the rectified and filtered current to a load 11. Other types of commonly used rectifiers and filters could be used if desired. The alternating-current source 10 is connected to the primary winding 12 of a transformer 13 having a secondary winding 14 with two end terminals 15 and 16 and a mid-terminal 17. The end terminals 15 and 16 are connected through rectifying elements 18 and 19 respectively to the positive rectifier output terminal 20 and the mid-terminal 17 is connected to the negative rectifier output terminal 21.

There is connected across the rectifier output terminals 20 and 21 a current path comprising in series a resistor 22 and an electrolytic capacitor 23. The capacitor 23 has equivalent capacitance C, inductance $L_c$ and resistance $R_c$, all in series, as indicated in the drawing. The resistor 22 and its connecting leads has some series inductance associated therewith as indicated by the numeral 24. There is provided a transformer comprising a winding 25 on a laminated core 26 of magnetic material having a gap 27 devoid of magnetic material in its magnetic circuit. The entire winding 25 and the load 11 in series are connected to the rectifier output terminals 20, 21. A primary portion 28 of the winding 25 is connected across the resistor 22. A secondary portion 29 of the winding 25 and the load 11 in series are connected across the electrolytic condenser 23. The ratio of the turns of secondary 29 to the turns of primary 28 is made substantially equal to the ratio of the equivalent series resistance $R_c$ of the electrolytic condenser 23 to the resistance of the resistor 22. When thus proportioned, the ripple voltage across resistor 22 due to a ripple current in the path comprising resistor 22 and condenser 23 is impressed upon the primary 28 to cause to be induced in the secondary 29 a ripple voltage substantially equal to the ripple voltage across the internal resistance $R_c$ of the capacitor 23. The ripple voltage induced in secondary 29 being substantially equal and opposite the ripple voltage across resistance $R_c$ in the circuit comprising capacitor 23, secondary winding 29 and load 11, all in series, the ripple component supplied to the load 11 is greatly reduced or substantially eliminated.

Particularly at ripple frequencies greater than the frequency at which the equivalent series capacitance C and the equivalent series inductance $L_c$ of the electrolytic capacitor 23 would be in series resonance, the ratio of turns of secondary 29 to the turns of primary 28 should also be substantially equal to the ratio of the inductance $L_c$ of condenser 23 to the inductance 24 associated with resistor 22 and its connecting leads.

Figure 2:
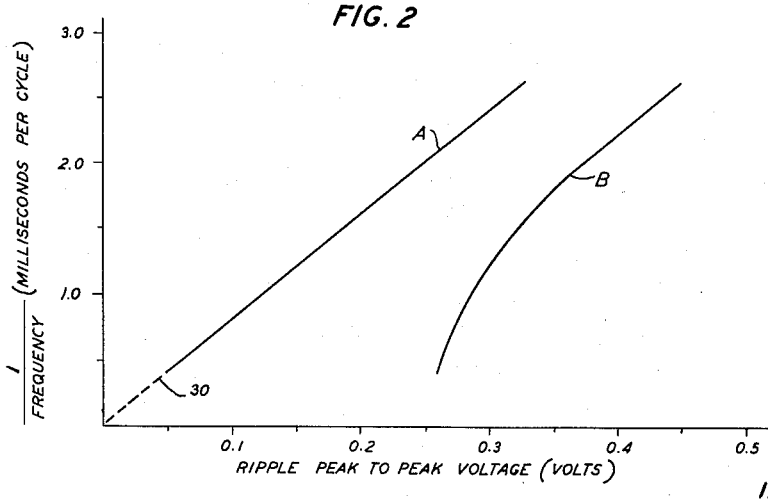
FIG. 2 is a diagram to which reference will be made in describing the rectifying apparatus shown in FIG. 1.

To illustrate the effectiveness of the circuit of FIG. 1 in reducing the ripple voltage component of the load voltage, experimental data were obtained from which the curves of FIG. 2 were plotted. In this graph, the reciprocal of the frequency of the alternating-current source 10 in milliseconds per cycle is shown as the ordinate and the peak to peak ripple voltage across the load as abscissa. Curve A is based upon data taken on the circuit of FIG. 1 as shown while curve B is based on data taken on the circuit of FIG. 1 modified by eliminating the resistor 22 and transformer 25, 26 and by connecting the positive load terminal and the positive terminal of condenser 23 directly to the positive rectifier output terminal 20.

In the circuit under test, the nominally 15,000-microfarad, 12-volt D.C. electrolytic capacitor 23 had a measured capacitance C of 24,098 microfarads at a frequency of 60 cycles per second and an equivalent series resistance $R_c$ of 0.029 ohm. The transformer winding 25 had 10 turns of No. 12 A.W.G. copper wire, the primary 28 and secondary 29 each having 5 turns. The core 26 was formed of a ⅜ inch stack of E–I type laminations of magnetic material having a ⅜ inch center tongue width. The gap 27 was provided by means of a .003 inch non-magnetic shim. Resistor 22 was made from 4¾ inch straight strip of ⅜ inch by 0.0159 inch copel resistance ribbon and it had a measured resistance of 0.01595 ohm. During the tests the rectified average value of the voltage across terminals 15 and 16 of transformer winding 14 was maintained constant at 20.0 volts and the average load current was maintained constant at 9.6 amperes. The frequency of the alternating-current source 10 was varied from 400 to 2400 cycles per second and readings were taken at 400, 600, 900, 1200, 1500, 1800, 2100 and 2400 cycles per second respectively.

It will be observed from FIG. 2 that the ripple voltage component across the load is considerably higher when the electrolytic condenser 23 alone is used as the filtering element (curve B) than when the filtering circuit as shown in FIG. 1 is used (curve A). At a source frequency of 2400 cycles per second, the use of the invention as shown in FIG. 1 results in reducing the ripple component from about 0.26 volt to about 0.05 volt. This is a ripple reduction of about 81 percent. At 400 cycles, the ripple reduction is only about 22 percent. While not shown by the curves of FIG. 2, it seems clear that at the commonly used power frequency of 60 cycles per second, the percentage ripple reduction resulting from the use of resistor 22, transformer 25, 26 and the electrolytic condenser 23, as shown in FIG. 1, rather than the electrolytic condenser 23 alone, would be negligibly small. In fact, curve A is substantially a straight line which, if extended as shown by the dashed portion 30, would pass through the origin of the coordinate system. The plotted result which would be achieved by using an ideal capacitor, that is, a capacitor having only capacitance C, connected across the rectifier output terminals 20, 21 and across the load 11 is a straight line passing through the origin. The close approximation to the ideal exhibited by the curve A indicates the effectiveness of the compensation for the internal effective series resistance $R_c$ of the electrolytic capacitor 23 which is produced by the use of the resistor 22 and the transformer 25, 26 in the circuit shown in FIG. 1. In the test of the circuit of FIG. 1 no effort was made to adjust the inductance of resistor 22 and its connecting leads to compensate for the equivalent series inductance $L_c$ of the electrolytic condenser 23 but this result may possibly have been achieved accidentally.

Figure 3:
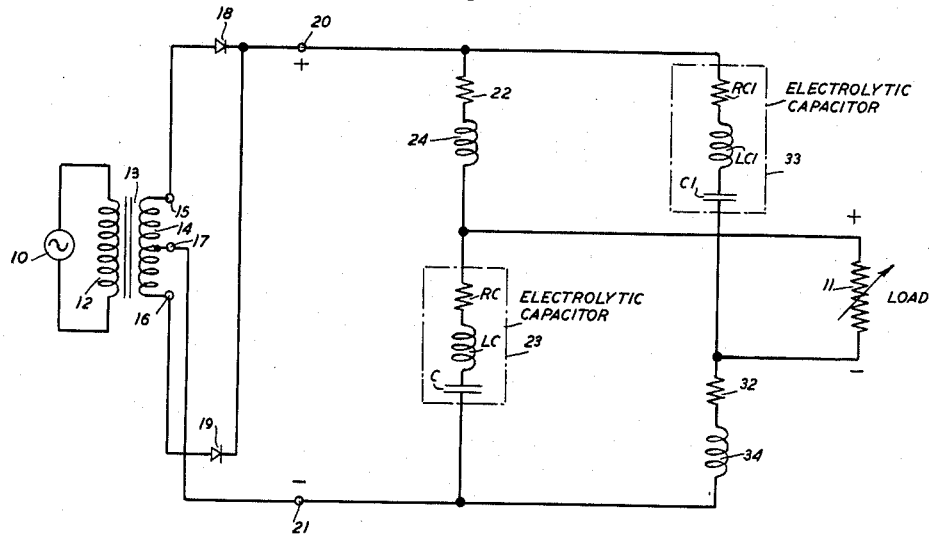
FIGS. 3 and 4 are schematic views of modifications of the rectifying apparatus shown in FIG. 1.

In the modified rectifying apparatus of FIG. 3, the components corresponding to those used in FIG. 1 are designated by the same numerals and letters. In FIG. 3 the transformer 25, 26 of FIG. 1 is not employed. Instead, there is provided a second shunt current path across the rectifier output terminals 20, 21 which comprises in series an electrolytic condenser 33 substantially identical to the condenser 23 and a resistor 32 substantially identical to the resistor 22. There is thus formed a bridge circuit having condensers 23 and 33 connected in one pair of opposite arms and having resistors 22 and 32 connected in the remaining pair of opposite arms. One pair of opposite vertices of the bridge is connected to the rectifier output terminals 20 and 21 respectively and the remaining pair of opposite vertices is connected to the load terminals respectively.

Starting at the positive load terminal, a circuit may be traced through the load 11 to its negative terminal, through electrolytic capacitor 33 and thence through resistor 22 to the positive load terminal. Since the resistances of resistors 22 and 32 and the resistances $R_c$ and $R_{c1}$ are equal and capacitances C and $C_1$ are equal, the variational voltages across the resistors 22 and 32 and across resistances $R_c$ and $R_{c1}$ will be equal. In the circuit traced above, the variational voltages across resistor 22 and across resistance $R_{c1}$ are opposed, thus suppressing the ripple voltage in the load circuit. The voltage appearing across the load 11 is thus equal to the voltage across the capacitance $C_1$ of condenser 33. If the resistors 22 and 32 are constructed with the same inductance as the equivalent series inductance of the capacitors 33 and 23, variational voltages associated with the equivalent series inductance can also be suppressed.

Figure 4:
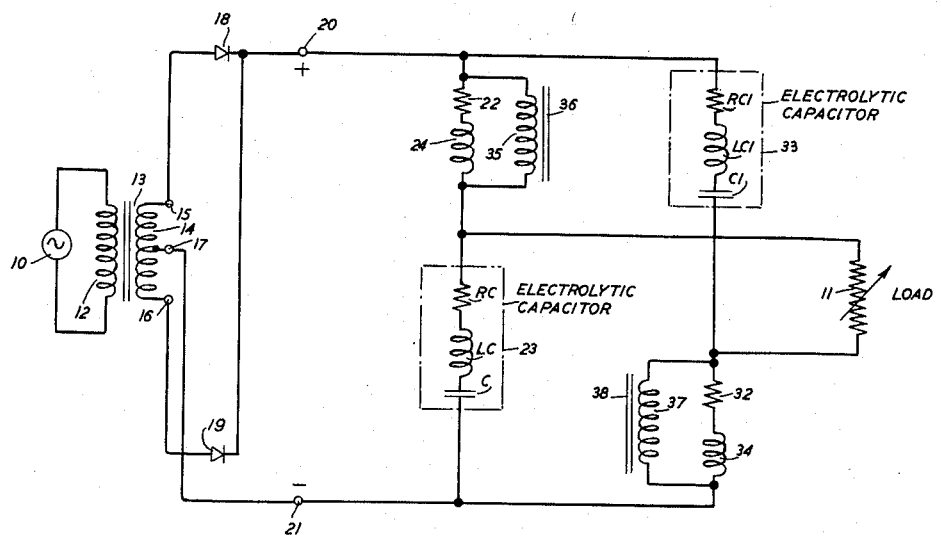

The direct current flowing from the positive rectifier output terminal 20 through resistor 22, the load 11 and resistor 32 in series to the negative rectifier terminal 21 will produce voltage drops across resistors 22 and 32 which vary with load current. In many cases the resistance $R_c$ and the resistance $R_{c1}$ will be sufficiently low that the voltage drops across resistors 22 and 32 will be negligibly small. Where this is not the case, however, the rectifying circuit of FIG. 3 may be modified as shown in FIG. 4. The corresponding components of FIGS. 3 and 4 are designated by the same numerals and letters.

FIG. 4 differs from FIG. 3 in that there are provided two substantially identical inductive reactors one comprising a winding 35 on a core 36 of magnetic material and the other comprising a winding 37 on a core 38 of magnetic material. Winding 35 is connected across resistor 22 and winding 37 is connected across resistor 32. Each of cores 36 and 38 has a gap devoid of magnetic material in its magnetic circuit to prevent saturation of the cores due to the magnetomotive force set up by the direct-current component flowing through the winding on the core. Each of windings 35 and 37 has sufficiently low resistance that the direct voltage drop across it is negligibly small and has an impedance at the ripple frequency which is high compared with the resistance of each of resistors 22 and 32. If desired, windings 35 and 37 may be wound on a single core, the windings being wound in a direction such that the current supplied from the rectifier to winding 35, load 11 and winding 37, all in series, causes aiding magnetomotive forces to be set up in the common magnetic circuit for the two windings.

Where considerable power is involved, it may be impossible to obtain sufficient capacitance within a single electrolytic condenser unit. The electrolytic capacitors 23 and 33 may therefore comprise a plurality of units or condensers connected in parallel to obtain the necessary capacitance.

At a frequency equal to or less than the frequency at which the capacitance C and the inductance $L_c$ of the capacitor 23, for example, are in series resonance, it is desirable for the reduction or suppression of the fundamental ripple component voltage to make the resistor 22 as nearly non-inductive as possible. If this is done, the ripple component of frequency equal to the series resonant frequency would be reduced very nearly to zero in the output or load circuit. This is due to the fact that the reactance resulting from the equivalent series inductance and the equivalent series capacitance of the electrolytic capacitor 23 is less than the reactance of the capacitance alone at a frequency equal to or less than the resonant frequency. At the resonant frequency the series reactance of the capacitor 23 would be zero, so that if resistor 22 were non-inductive, complete cancellation of the ripple would appear to be possible at this frequency. This design of the filtering means would be particularly important where the ripple voltage at the capacitor is composed almost entirely of a single frequency component or where it is desired to suppress the resonant frequency component volatge in the output without regard for other frequency components.

What is claimed is:

1. The combination with a direct-current source having an alternating component, of an electrolytic capacitor, a resistor, a transformer having a primary and a secondary, means for connecting said resistor and electrolytic capacitor in series across said current source, means for connecting said transformer primary across said resistor, and means for connecting said transformer secondary in series with said electrolytic capacitor and a load.

2. The combination with a filter condenser of the type having substantial internal resistance in series with its capacitance of means for compensating for the effects of said internal resistance comprising a resistor in series with said condenser and a current source, a transformer having a primary winding and a secondary winding, means for connecting siad primary winding across said resistor, and a circuit comprising said condenser and said secondary winding in series, the ratio of the secondary turns to the primary turns of said transformer being substantially equal to the ratio of said internal resistance to the resistance of said resistor.

3. The combination with a filter condenser of the type having internal resistance and internal inductance each in series with its capacitance of means for compensating for the effects of said internal resistance and said internal inductance comprising an impedance having a resistive component and an inductive reactive component in series with said condenser and a current source, a transformer having a primary winding and a secondary winding, means for connecting said primary winding across said impedance, and a circuit comprising said condenser and said secondary winding in series, the ratio of the secondary turns to the primary turns of said transformer being substantially equal to the ratio of said internal resistance to the resistance of said resistive component and being substantially equal to the ratio of said internal inductance to the inductance of said inductive reactive component.

4. Apparatus for supplying current from a source of direct current having an alternating component to a load comprising an electrolytic capacitor, an impedance, a transformer having a primary and a secondary, a shunt current path across said current source comprising said impedance and said capacitor in series, means for connecting said primary across said impedance, and means for connecting said load across a current path comprising said capacitor and said secondary in series.

5. In combination, a direct-current source having an alternating component for supplying to a load circuit including a load, a resistor, an electrolytic condenser, a first current path connected across said current source comprising said resistor and said condenser in series, an inductive device comprising a winding on a core of magnetic material, said winding having a pair of end terminals and a terminal intermediate its end terminals, a second current path connected across said current source comprising said winding and said load in series, said condenser and said resistor having a common terminal, and means for connecting said common terminal to said intermediate terminal of said winding.

6. In combination, a direct-current source having an alternating component for supplying current to a load circuit including a load, an electrolytic condenser having internal resistance in series with its capacitance, a resistor, a current path connected across said current source comprising said resistor and said condenser in series, an inductive device comprising a winding on a core of magnetic material, said winding having a first and a second winding portion, means for connecting said first winding portion across said resistor, and means for connecting said second winding portion and said load in series across said condenser.

7. A combination in accordance with claim 6 in which the ratio of the turns of said second winding portion to the turns of said first winding portion is substantially equal to the ratio of said internal resistance to the resistance of said resistor.

8. A combination in accordance with claim 7 in which said core forms a flux path of magnetic material having therein a gap devoid of magnetic material.

9. A combination in accordance with claim 7 in which said electrolytic condenser has internal inductance in series with its capacitance, in which the impedance of said resistor has an inductance component associated therewith and in which the ratio of the turns of said second winding portion to the turns of said first winding portion is substantially equal to the ratio of said internal inductance to said inductance component.

10. Apparatus for supplying to a load circuit including a load current from a source of direct current having a ripple component, an electrolytic condenser having an internal resistance component in series with its capacitance, a resistor, means for supplying current from said source to a current path comprising in series said resistor and said electrolytic condenser, means comprising said resistor for deriving from said current source a voltage substantially equal to the ripple voltage across said internal resistance component, and means connected across said resistor and capacitor for supplying to said load the steady component of said current and for suppressing ripple components thereof, said means comprising means for impressing across said load a voltage equal to the vector sum of the voltage across said electrolytic condenser and said derived voltage in phase opposition to the ripple voltage across said internal resistance component.

11. Apparatus for supplying to a load circuit including a load current from a source of unidirectional current having an alternating-current component, of an electrolytic condenser having internal resistance and inductance in series with its capacitance, an impedance having a resistive component and an inductive reactive component, means for supplying current from said current source to a current path comprising in series said impedance and said electrolytic condenser, means comprising said impedance for deriving from said current source a voltage substantially equal to the alternating component voltage across said internal resistance and inductance, and means for supplying to said load the steady component of the current from said source and for suppressing said alternating component, said means comprising means connected across said impedance for impressing across said load a voltage equal to the vector sum of the voltage across said electrolytic condenser and said derived voltage in phase opposition to the alternating component voltage across said internal resistance and inductance.

12. The combination with a source of unidirectional current having an alternating-current component, of two substantially identical electrolytic capacitors each having internal series resistance, two substantially identical resistors each having resistance substantially equal to the resistance of said internal resistance, a bridge circuit having said electrolytic capacitors in one pair of opposite arms and having said resistors in the remaining pair of opposite arms respectively, thereby forming a pair of opposite input vertices and a pair of opposite output vertices, means for connecting said input vertices to said current source, and means for connecting said output vertices to a load.

13. The combination with a source of unidirectional current having an alternating-current component, of two substantially identical electrolytic capacitors each having internal series resistance and inductance, two substantially identical impedances each having resistance substantially equal to said internal resistance and inductance substantially equal to said internal inductance, a bridge circuit having said electrolytic capacitors in one pair of opposite arms and having said impedances in the remaining pair of opposite arms respectively, thereby forming a pair of opposite input vertices and a pair of opposite output vertices, means for connecting said input vertices to said current source, and means for connecting said output vertices to a load.

14. A combination in accordance with claim 12 in which there are provided two substantially identical inductors connected across said resistors respectively, each of said inductors having an impedance which is high and a resistance which is low relative to the resistance of each of said resistors.

References Cited in the file of this patent

UNITED STATES PATENTS

| | | |
|---|---|---|
| 2,373,601 | Robinson | Apr. 10, 1945 |
| 2,710,938 | Lee | June 14, 1955 |
| 2,744,228 | Morrison | May 1, 1956 |